United States Patent
Harris

(10) Patent No.: US 8,419,876 B1
(45) Date of Patent: Apr. 16, 2013

(54) FLAME RETARDENT COMPOSITE STRUCTURES AND METHOD OF MAKING THE SAME

(75) Inventor: John N. Harris, Seattle, WA (US)

(73) Assignee: The Boeing Company, Chicago, IL (US)

(*) Notice: Subject to any disclaimer, the term of this patent is extended or adjusted under 35 U.S.C. 154(b) by 619 days.

(21) Appl. No.: 12/564,184

(22) Filed: Sep. 22, 2009

(51) Int. Cl.
*B32B 37/00* (2006.01)
(52) U.S. Cl.
USPC ............................ 156/196; 156/221; 156/227
(58) Field of Classification Search .................. 156/196, 156/221, 227
See application file for complete search history.

(56) References Cited

U.S. PATENT DOCUMENTS

| 3,669,299 | A | 6/1972 | Jones et al. |
|---|---|---|---|
| 4,156,752 | A | 5/1979 | Riccitiello et al. |
| 4,299,872 | A | 11/1981 | Miguel et al. |
| 4,676,025 | A * | 6/1987 | Mattscheck et al. ............ 52/232 |
| 4,686,244 | A | 8/1987 | Dietlein et al. |
| 4,719,249 | A | 1/1988 | Dietlein et al. |
| 6,511,730 | B1 | 1/2003 | Blair et al. |
| 7,284,726 | B2 | 10/2007 | Fabian et al. |
| 2007/0289248 | A1 | 12/2007 | Schmitz |

* cited by examiner

*Primary Examiner* — Katarzyna Wyrozebski Lee
*Assistant Examiner* — John Blades
(74) *Attorney, Agent, or Firm* — Yee & Associates, P.C.

(57) ABSTRACT

A method of fabricating a composite structure exhibiting reduced flammability includes forming a joint between two composite sections and substantially filling the joint with a structural adhesive. A strip of intumescent material is formed and placed in the joint surrounded by the intumescent material.

19 Claims, 6 Drawing Sheets

FLAME RETARDENT COMPOSITE STRUCTURES AND METHOD OF MAKING THE SAME

TECHNICAL FIELD

This disclosure generally relates to composite structures, and deals more particularly with structural adhesives used to bond composite parts.

BACKGROUND

Composite structures are sometimes required to meet flammability performance specifications. Constituents of composite structures may vary in their flammability, consequently it may be necessary to consider the flammability of each of these constituents in designing a composite structure. For example, in the aircraft industry, certain types of joints are used to fabricate composite structures having radiused corners such as stow bins, closets, galleys and laboratories. These joints may require the use of adhesives in order to provide a joint that meets performance specifications for strength, durability and other requirements. Potting compounds are one form of adhesive that may be used to fill composite joints. Potting compounds may be desirable for filling joints because of their relatively low flammability, however in some applications, they may not provide the bond strength necessary to meet performance specifications. In other applications, high strength structural adhesives may be desirable for use in composite joints because of their relatively high bond strength, however such adhesives may exhibit less than desirable flammability when compared to lower strength potting compounds.

Accordingly, there is a need for flame retardant composite structures and a method of making the same that allow the use of high strength structural adhesives, particularly in areas of joints.

SUMMARY

The disclosed embodiments provide a flame retardant composite structure having a joint that employs high strength structural adhesives, but yet has a flammability ratings that may be at least as favorable as that of potting compounds. A strip of intumescent material is placed in the joint. When subjected to a threshold temperature from a heat source such as a flame, the intumescent strip is converted by pyrolysis to a carbonaceous foam. The carbonaceous foam provides a thermal barrier that insulates at least portions of the adhesive from the flame source, and results in a reduction of the temperature of the adhesive. A thermal conductor, such as a metallic wire, may be integrated into the intumescent strip in order to conduct heat away from the area in the joint subjected to the flame source, thereby further reducing the temperature of the adhesive in the area of the flame source.

According to one disclosed embodiment, an adhesive bonding method is provided for use in composite structures. The method includes introducing an intumescent material into an uncured adhesive and applying the adhesive on a composite structure. The method further includes curing the adhesive. The intumescent material may be mixed into the adhesive or fabricated into a device that is placed into the adhesive. Fabricating the intumescent material into a device may further include assembling a thermal conductor and a strip of the intumescent material.

According to another embodiment, a method is provided of fabricating a composite structure exhibiting reduced flammability. The method comprises forming a joint between two composite sections and substantially filling the joint with a structural adhesive. A strip of intumescent material is formed and placed in the joint. Forming the strip of intumescent material may include assembling a thermal conductor and a layer of the intumescent material.

According to another disclosed embodiment, a method is provided of fabricating a composite structure comprising forming a slot in a composite panel and bending the panel about the slot to define a pair of composite sections and an open joint between the sections. The method includes also substantially filling the open joint with a structural adhesive and forming a strip of intumescent material. The strip of intumescent material is placed in the joint, substantially surrounded by the adhesive.

According to still another embodiment, a composite structure comprises first and second adjacent composite sections and a substantially hollow joint between the panel sections. A structural adhesive substantially fills the joint along with an intumescent material. The intumescent material may comprise a strip that is substantially surrounded by adhesive in the joint. The composite structure may further comprise a thermal conductor within the joint that is coupled with the strip of intumescent material.

The disclosed embodiments satisfy the need for a flame retardant composite structure and method of making the same which allows the use of high strength structural adhesives, especially for bonding joints in the structure.

BRIEF DESCRIPTION OF THE ILLUSTRATIONS

DETAILED DESCRIPTION

Figure 1:
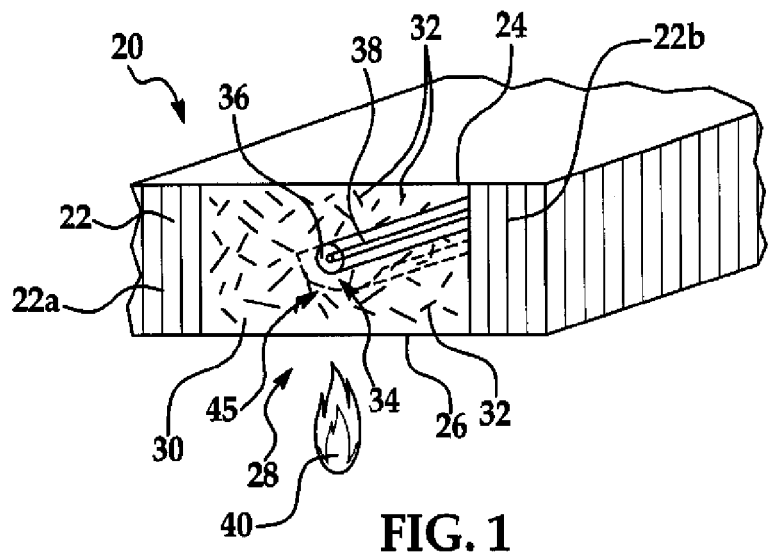
FIG. 1 is an illustration of a joint in a composite structure filled with a high strength adhesive and an intumescent device.

Referring first to FIG. 1, the disclosed embodiments relate to a flame retardant composite structure 20 that employs a relatively high strength structural adhesive 30, such as, without limitation, an epoxy adhesive, to join constituent parts or add strength to the composite structure 20. In the illustrated example, the composite structure 20 comprises a pair of spaced apart facesheets 24, 26 between which there is sandwiched a core 22. In the illustrated example, the core 22 comprises a honeycomb structure, however a variety of other types of cores 22 are possible, including, without limitation, foams, ceramics or multi-ply composite laminates. The adhesive 30 fills a joint 28 between and adhesively bonds together two sections 22a, 22b of the core 22. The joint 28 is merely illustrative of a wide range of applications of the high strength adhesive 30. The joint 28 may be reinforced by reinforcing fibers 32 mixed into the adhesive 30. The reinforcing fibers 32 may comprise, without limitation, glass, carbon or aramid fibers, to name only a few.

In some applications, the flammability of the adhesive 30 may exceed maximum allowed values. In accordance with the disclosed embodiments, the flammability performance of the composite structure 20 may be improved and use of the adhesive 30 permitted by incorporating an intumescent device 34 into the joint 28. In the embodiment shown in FIG. 1, the intumescent device 34 is located generally centrally within the joint 28, surrounded by the adhesive 30. Other placement locations may be possible however. The device 34 comprises an elongate thermal conductor 38 which may comprise a length of a flexible metallic wire, surrounded by a layer 36 of intumescent material.

As will be discussed below in more detail, when the composite structure 20, and particularly the joint 28 is subjected to heat generated by a flame 40 or other heat source, the temperature of the adhesive 30 as well as the device 34 becomes elevated. When the temperature of the intumescent material 36 exceeds a threshold value, the intumescent material 36 is converted by pyrolysis to a carbonaceous foam that has a tendency to expand and create a thermal barrier 45. The thermal barrier 45 tends to insulate the adhesive 30 from the heat generated by the flame 40, and may prevent the adhesive from reaching its ignition temperature. In addition, the conductor 38 may assist in conducting heat away from the location of the flame 40, thereby further reducing the possibility of the adhesive 30 reaching its ignition temperature.

Figure 2:
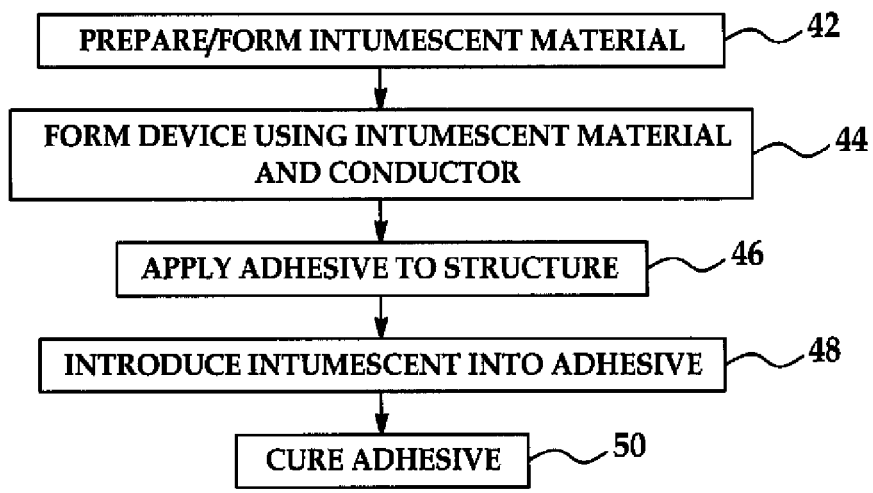
FIG. 2 is an illustration of a flow diagram of an adhesive bonding method according to the disclosed embodiments.

Attention is now directed to FIG. 2 which illustrates the basic steps of a method of fabricating a composite structure 20 employing a high strength structural adhesive 30. Beginning at step 42, intumescent material 36 is prepared and/or formed into a desired shape. The intumescent material 36 may comprise, without limitation, any of a wide range of compounds that swell as a result of heat exposure, thus increasing in volume and decreasing in density. The intumescent material 36, when subjected to a threshold temperature, produces a light carbonaceous char which is a poor conductor of heat, and thus retards heat transfer. The intumescent material 36 may also contain a significant amount of hydrates. As the material 36 is heated, the hydrates are spent and water vapor is released, which has a cooling effect. It may also be possible to use harder chars produced with sodium silicates and graphite. During pyrolysis of the intumescent material 36, nitrogen may be generated which may reduce the amount of oxygen available for combustion thus further contributing to a reduction of flammability of the adhesive 30.

In one embodiment, at step 44, the intumescent device 34 is formed by combining and/or assembling the intumescent material 36 with one or more conductors 38. At 46, the adhesive 30 is applied to the composite structure 20 which, in the case of the embodiment shown in FIG. 1, involves filling the joint 28 with the adhesive 30. At step 48, the intumescent 36 is introduced into the adhesive 30. In one embodiment, as will be discussed below in more detail, the intumescent 36 is introduced into the adhesive 30 by placing the intumescent device 34 in a desired position within the joint 28. In other embodiments, however, a quantity of the intumescent material 36 in powder form may be mixed into the adhesive 30. Finally, at step 50, the adhesive 30 is cured.

Figure 3:
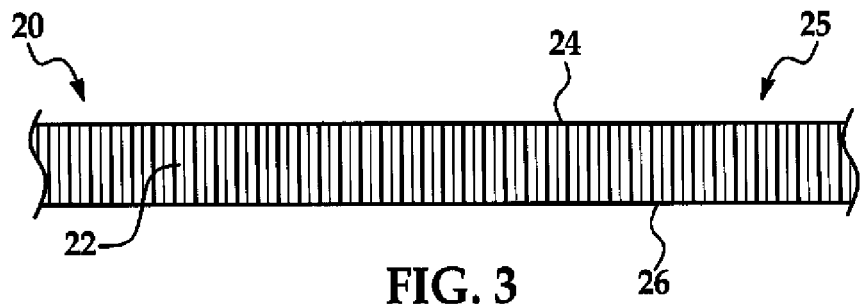
FIG. 3 is an illustration of a sectional view of a composite panel.

Attention is now directed to FIGS. 3-7 which illustrate successive steps of a method of fabricating a composite structure 20 exhibiting improved flammability performance through the use of intumescent materials 36 (FIG. 1). FIG. 3 illustrates a composite structure 20 in the form of the composite panel 25. The panel 25 comprises a pair of spaced apart composite facesheets 24, 26 between which there is sandwiched a core 22 which, in the illustrated embodiment comprises a honeycomb. As previously discussed, however, the core 22 may comprise any of a wide range of other materials.

Figure 4:
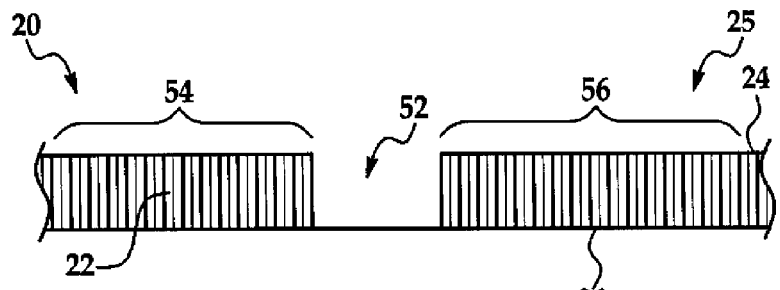
FIG. 4 is an illustration similar to FIG. 3 but showing a channel having been formed in the panel.

Referring to FIG. 4, a channel 52 is cut in the panel 25 by removing a strip of the core 22 and facesheet 24. The channel 52 may be formed using any of various material removal tools, such as a router (not shown), and divides the panel 25 into first and second adjacent panel section 54, 56, respectively.

Figure 5:
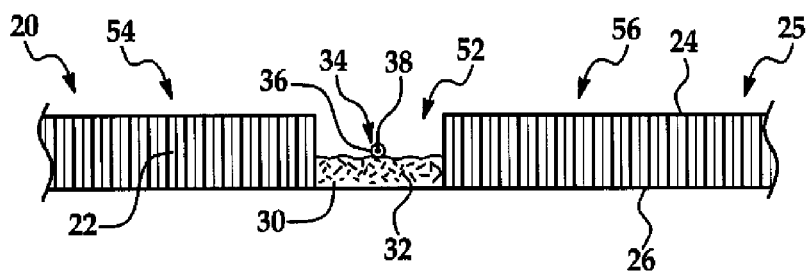
FIG. 5 is an illustration similar to FIG. 4 but showing a layer of structural adhesive and an intumescent device having been introduced into the slot.

Next, as shown in FIG. 5, the channel 52 is partially filled with an uncured, high strength structural adhesive, such as, without limitation, an epoxy adhesive which may or may not include reinforcing fibers 32, as previously mentioned. An intumescent device 34 is then placed on top of the adhesive 30 within the channel 52 so as to be generally centrally located in the channel 52.

Figure 6:
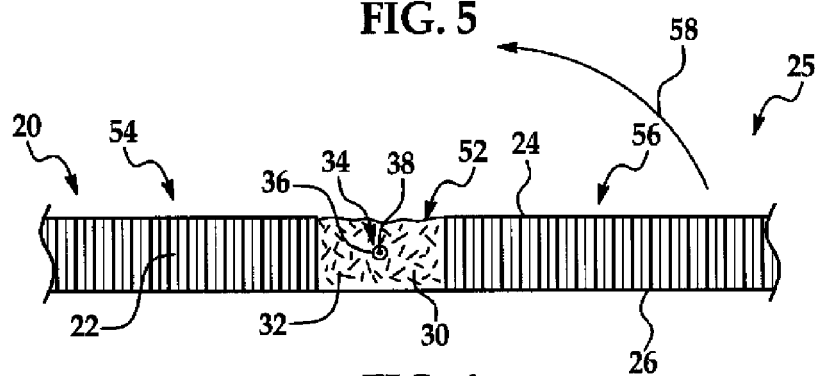
FIG. 6 is an illustration similar to FIG. 5 but showing an additional level of structural adhesive having been introduced into the slot.

Next, as shown in FIG. 6, the remaining volume of the channel 52 is filled with additional adhesive 30, thereby covering and entrapping the intumescent device 34 in its central location within the channel 52. With the channel 52 filled with adhesive 30, one of the panel sections 56 is rotated, as shown by the arrow 58 about the channel 52 so as to bend the panel 25.

Figure 7:
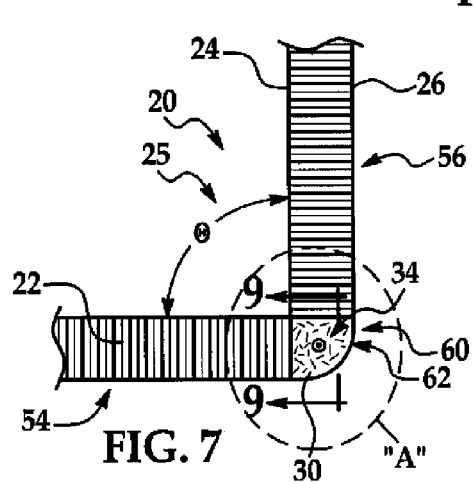
FIG. 7 is an illustration of the panel shown in FIG. 6 after bending the panel sections to form a bonded joint.

FIG. 7 illustrates panel section 56 having been rotated to its final position so that the panel 25 has a bend angle θ. As panel section 56 is rotated, facesheet 26 is bent to form an outer bend radius 62. While FIG. 7 illustrates a bend angle θ of approximately 90 degrees, it is possible that θ may be more or less than 90 degrees. Bending of the panel sections 54, 56 relative to each other closes the channel 52 (FIG. 6) to form a substantially closed joint 60 between panel sections 54, 56 which is filled with high strength structural adhesive 30 containing the intumescent device 34.

Figure 8:
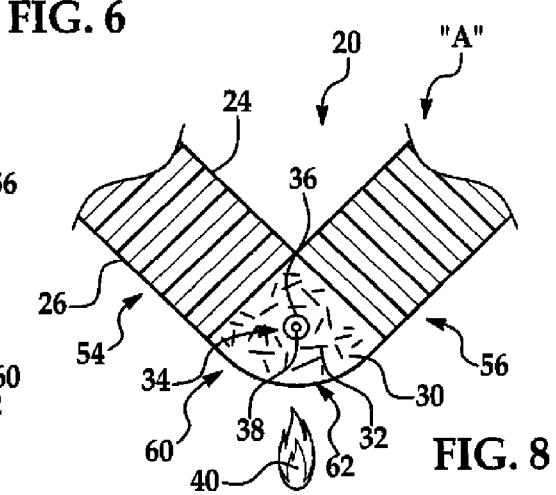
FIG. 8 is an illustration of a portion of the panel shown in FIG. 7 designated as "A", and showing the joint being subjected to a flame.
Figure 9:
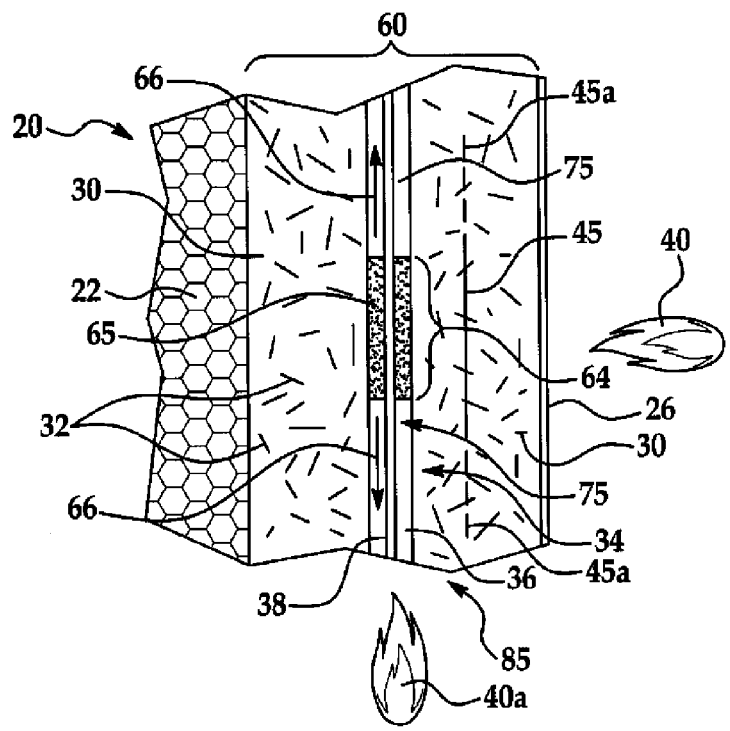
FIG. 9 is an illustration of a sectional view taken along the line 9-9 in FIG. 7, and showing the joint being subjected to flames.

FIG. 8 illustrates the joint 60 being subjected to heat generated by a flame 40 which heats the composite structure 20 in the area of the bend radius 62. Referring also to FIG. 9, a section 64 of the intumescent material 36 nearest a flame 40 in the area of the bend radius 62 (FIG. 8) is converted to a carbonceaous foam 65 which creates a localized thermal barrier 45 that thermally insulates the adhesive 30 from the heat produced by the flame 40. In addition, the thermal conductor 38 carries heat away from the area 64, as indicated by the arrows 66. As heat is carried by the conductor 38, additional sections 75 along the intumescent strip 36 may reach the threshold temperature and be converted to foam, thereby providing additional thermal insulation and extending the length of the barrier 45, as indicated by the dotted line 45a.

The use of the intumescent device 34 may also improve flammability performance of the composite structure during standardized tests used to measure the flammability of composite structures. In one such test, referred to as a "Vertical Bunsen Burner" (VBB) test, an exposed, cross sectioned end 85 of a test sample of the joint 60 is subjected to a Bunsen burner flame 40a. The joint 60 is evaluated for flame propagation length and self extinguishing time according to prescribed reference standards. The cross sectioned joint 60 may be subjected to the flame 40a for a prescribed length of time, for example 60 seconds, which may result in the ignition of the constituents within the joint, including the adhesive 30, at the exposed end 85. When ignited, the self extinguishing time is measured, defined as the length of time required for ignited constituent to extinguish itself. The length of any flame (not shown) resulting from ignition of a constituent may also be measured. The use of the intumescent device 34 may reduce the self extinguishing times and length of flame propagation during the VBB test. Moreover, the use of the intumescent device 34 in the joint 60 may prevent the adhesive 30 from reaching its ignition temperature.

Figure 10:
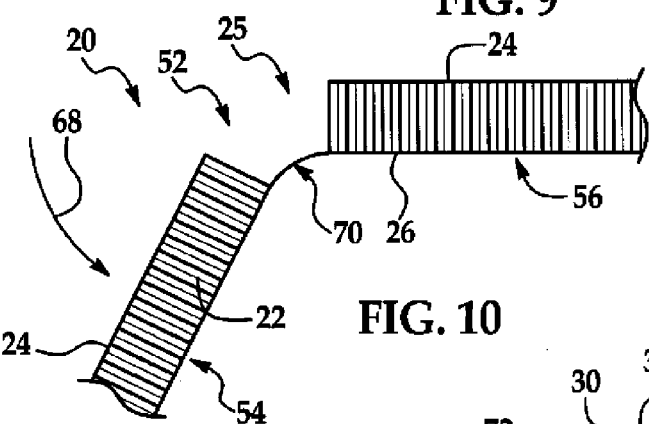
FIG. 10 is an illustration of a channeled panel having been bent to form an outside joint.
Figure 11:
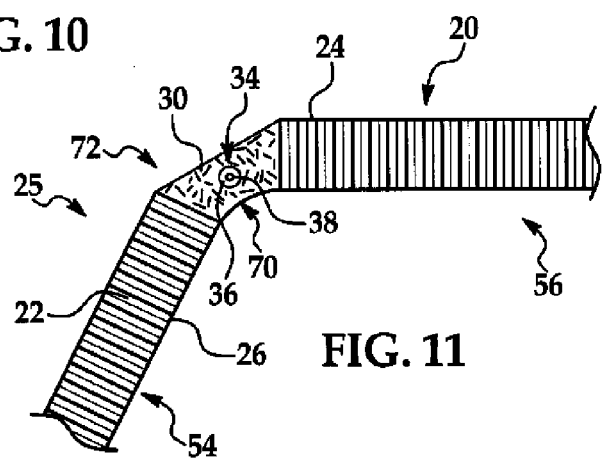
FIG. 11 is an illustration similar to FIG. 10, but showing the joint having been filled with a structural adhesive and an intumescent device.

FIGS. 10 and 11 illustrate another composite structure 20 in which a panel 25 is bent along an inside radius 70. As shown in FIG. 10, a channel 52 is cut in the panel 25 to form adjacent panel sections 54, 56 connected at the bend radius 70. One of the panel sections 54 is bent, as shown by the arrow 68, following which, as shown in FIG. 11, the channel 52 is filled with a high strength structural adhesive 30 containing an intumescent device 34 to form an outside bond joint 72 between panel sections 54, 56.

Figure 12:
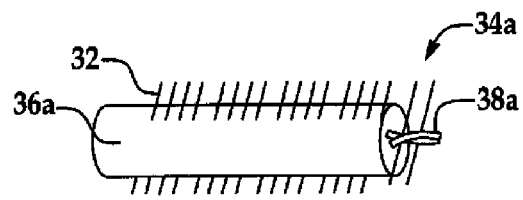
FIG. 12 is an illustration of a perspective view of an alternate form of an intumescent device.

A suitable intumescent device 34 may be formed using any of a variety of techniques. For example, as shown in FIG. 12, the intumescent device 34 may comprise an intumescent strip 34a. The intumescent strip 34a may be formed by twisting a pair of thermal conductors 38a and then coating the conductors 38a with intumescent material 36a. The conductors 38a may comprise any of various metals that are good thermal conductors. Reinforcing fibers 32, which may comprise, without limitation, glass, carbon or aramid fiber bristles may be embedded in the intumescent material 36a, or intertwined in the wires 38a and then saturated with the intumescent material 36a.

Figure 13:
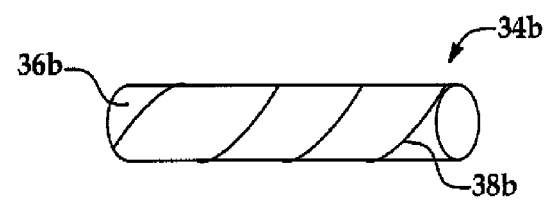
FIG. 13 is an illustration of a perspective view of another form of the intumescent device.

FIG. 13 illustrates another form of an intumescent device 34b in which a cylindrical strip 36b of intumescent material is spirally wrapped with a metal conductor 38b. The cylindrical intumescent strip 36b may be formed using any of various techniques, such as molding an intumescent compound which is then subsequently cured to form a relatively rigid structure.

Figure 14:
FIG. 14 is an illustration of a perspective view of a further embodiment of the intumescent device.

Another intumescent device 34c is shown in FIG. 14 wherein a cylindrical conductor 38c, which may be a metal wire or other similar thermal conductor, is coated with a layer of intumescent material 36c. Although not shown in the drawings, in some applications, it may be possible to improve flammability performance in the composite structure 20 using a metal wire insert 38c that is uncoated. Also, although not shown in the drawings, flammability performance of composite structures containing high strength structural adhesives may be achieved by mixing an intumescent material in powder or granular form into an uncured adhesive 30 before the adhesive 30 is applied to the composite structure 20. In one application, it was found that the use of approximately 25 grams of the powdered intumescent material mixed with each 100 ml of high strength epoxy adhesive improved flammability performance of bonded joints 60.

Figure 15:
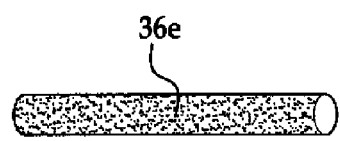
FIG. 15 is an illustration of a perspective view of another embodiment of the intumescent device.

FIG. 15 illustrates another intumescent device 36e comprising an intumescent material that is cast into a cylindrical strip.

Figure 16:
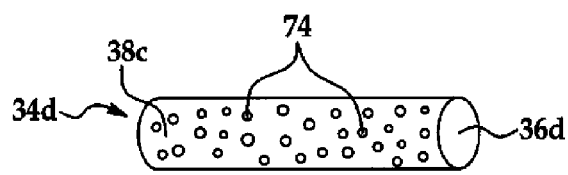
FIG. 16 is an illustration of a perspective view of still another form of the intumescent device.

FIG. 16 illustrates another embodiment of an intumescent device 34d in which a hollow metal tube 38c having perforations 74 is filled with an intumescent material 36d.

Figure 17:
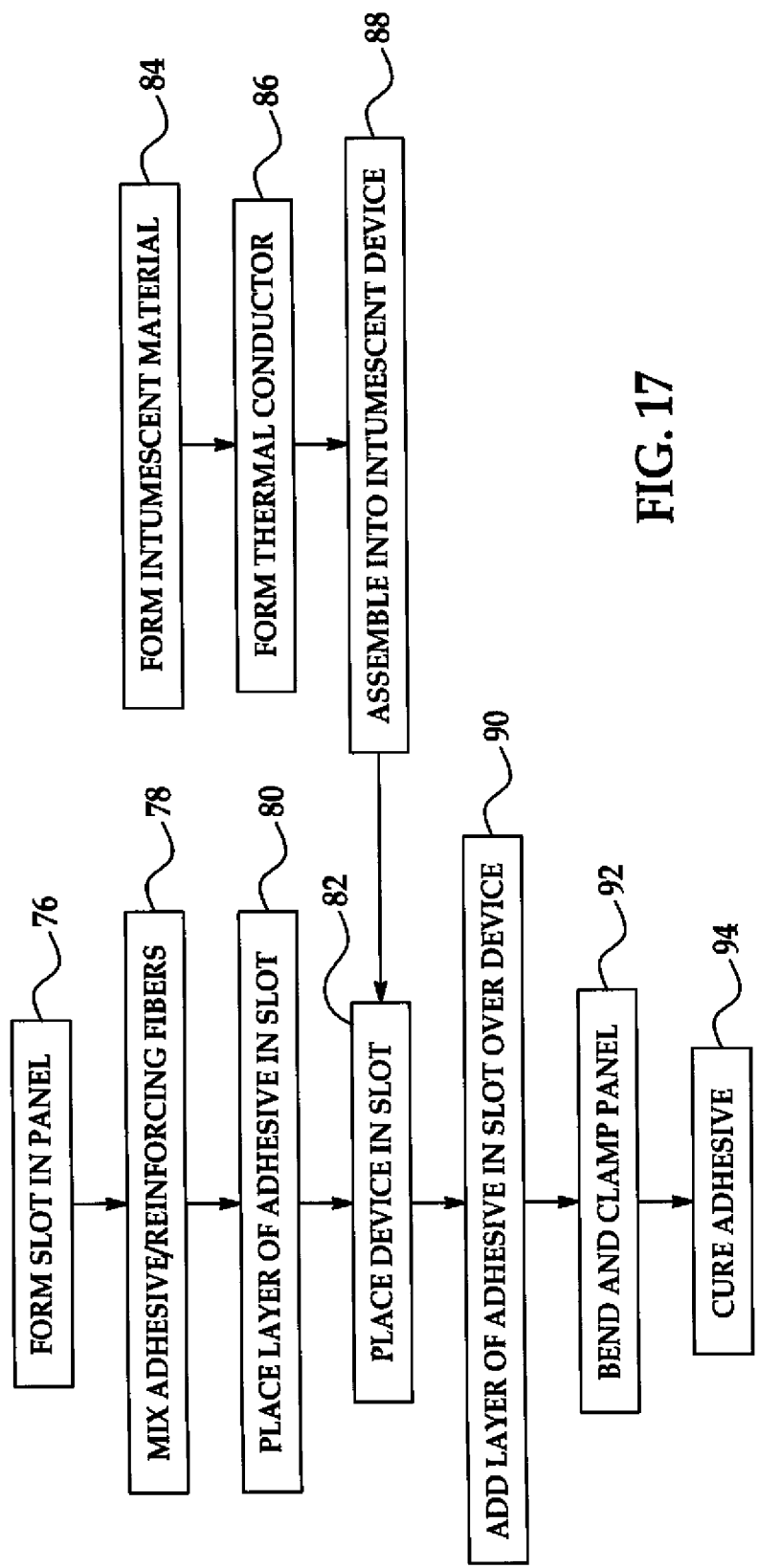
FIG. 17 is an illustration of a flow diagram of a method of forming a joint in a composite structure employing a structural adhesive and an intumescent device.

Attention is now directed to FIG. 17 which illustrates the basic steps of a method for fabricating a composite structure 20, such as that shown in FIG. 7 having a bend radius 62. Beginning at step 76, a slot 52 is cut in a panel 25, following which an adhesive 30 is prepared which may include mixing a two part adhesive and adding thereto optional reinforcing fibers 32. At 80, a layer of the adhesive 30 is introduced into the slot 52. In this example, an intumescent device 34 is fabricated by forming an intumescent material 64 at step 84 and forming a thermal conductor 38 at step 86. At 88, the intumescent material and the conductor 38 are assembled into a device 34 which is then placed in a slot 52, as shown at step 82. At step 90, an additional layer of the adhesive 30 is introduced into the slot 52, covering the intumescent device 52. At step 92, the panel 25 is bent about a bend radius 62, and then clamped. Finally, at step 94, the adhesive 30 is cured.

Figure 18:
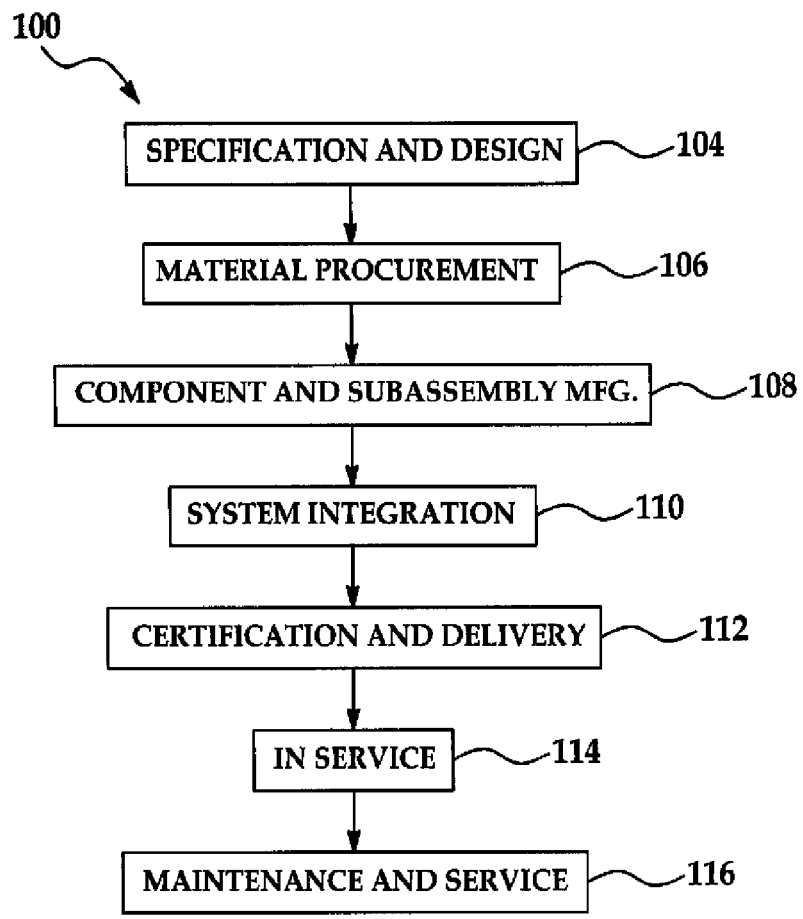
FIG. 18 is an illustration of a flow diagram of aircraft production and service methodology.
Figure 19:
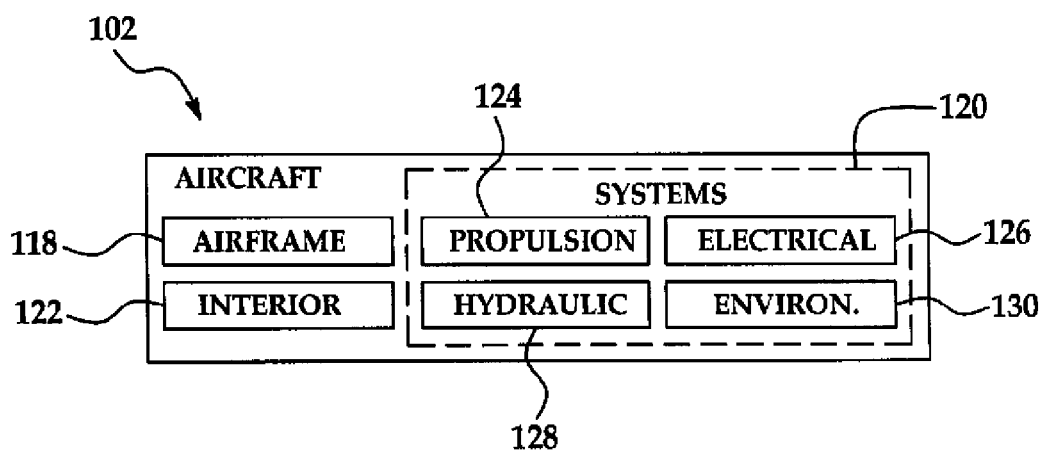
FIG. 19 is an illustration of a block diagram of an aircraft.

Embodiments of the disclosure may find use in a variety of potential applications, particularly in the transportation industry, including for example, aerospace, marine and automotive applications. Thus, referring now to FIGS. 18 and 19, embodiments of the disclosure may be used in the context of an aircraft manufacturing and service method 100 as shown in FIG. 18 and an aircraft 102 as shown in FIG. 19. During pre-production, exemplary method 100 may include specification and design 104 of the aircraft 102 and material procurement 106 in which the disclosed method may be specified for use in fabricating composite components used in the aircraft 102. During production, component and subassembly manufacturing 108 and system integration 110 of the aircraft 102 takes place. The disclosed cure tool may be used to co-cure part layups during these production processes. Thereafter, the aircraft 102 may go through certification and delivery 112 in order to be placed in service 114. While in service by a customer, the aircraft 102 is scheduled for routine maintenance and service 116 (which may also include modification, reconfiguration, refurbishment, and so on). The disclosed method may be used to manufacture replacement composite parts which are installed during the maintenance and service 116.

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 19, the aircraft 102 produced by exemplary method 100 may include an airframe 118 with a plurality of systems 120 and an interior 122. The disclosed cure tool may be used to cure composite parts which form part of, or may be installed on the airframe 118. Examples of high-level systems 120 include one or more of a propulsion system 124, an electrical system 126, a hydraulic system 128, and an environmental system 130. Any number of other systems may be included. Although an aerospace example is shown, the principles of the disclosure may be applied to other industries, such as the marine and automotive industries.

The disclosed composite structure and method of making the same may be employed during any one or more of the stages of the production and service method 100. For example, components or subassemblies corresponding to production process 108 may incorporate composite parts that are made according to the disclosed method. Also, one or more method embodiments, or a combination thereof may be utilized during the production stages 108 and 110, for example, by substantially expediting assembly of or reducing the cost of an aircraft 102. Similarly, the disclosed method may be used to manufacture composite parts that are utilized while the aircraft 102 is in service 114.

Although the embodiments of this disclosure have been described with respect to certain exemplary embodiments, it is to be understood that the specific embodiments are for purposes of illustration and not limitation, as other variations will occur to those of skill in the art.

What is claimed:

1. A method of fabricating a composite structure exhibiting reduced flammability, comprising:
    forming a joint between two composite sections;
    substantially filling the joint with a structural adhesive;
    forming a strip of intumescent material, the strip of intumescent material configured to create a localized thermal barrier to insulate the adhesive from a flame; and,
    placing the strip of intumescent material in the joint.

2. The method of claim 1, wherein placing the strip in the joint comprises positioning the strip in a location, wherein the location is configured to maintain strength of the structural adhesive.

3. The method of claim 1, wherein forming the strip of intumescent material comprises assembling a thermal conductor and a layer of the intumescent material.

4. A method of fabricating a composite structure, comprising:
    forming a channel in a composite panel;
    bending the panel about the channel to define a pair of panel sections and an open joint between the panel sections;
    substantially filling the open joint with a structural adhesive;
    forming a strip of intumescent material, the strip of intumescent material configured to create a localized thermal barrier to insulate the adhesive from a flame; and,
    placing the strip of intumescent material in the joint substantially surrounded by the adhesive.

5. The method of claim 4, wherein placing the strip in the joint comprises positioning the strip in a location, wherein the location is configured to maintain strength of the structural adhesive.

6. The method of claim 4, wherein forming the strip of intumescent material includes assembling a thermal conductor and a layer of the intumescent material.

7. The method of claim 6, wherein the assembling is performed by forming the layer around the conductor.

8. The method of claim 6, wherein the assembling is performed by wrapping the conductor around the strip of intumescent material.

9. The method of claim 6, wherein the assembling is performed by filling a conductive perforated hollow tube with the intumescent material.

10. The method of claim 6, wherein the assembling is performed by:
    coating first and second conductors with the intumescent material,
    applying reinforcing fibers to each of the coated conductors,
    twining the conductors, and
    curing the intumescent material.

11. A method of making a composite structure, comprising:
    providing a composite panel having a core and at least one outer facesheet;
    forming a channel partially through the depth of the panel that divides the panel into first and second panel sections;
    partially filling the channel with a high strength epoxy structural adhesive;
    assembling a device including a strip of intumescent material, reinforcing fibers, and a length of a conductor, the strip of intumescent material configured to create a localized thermal barrier to insulate the adhesive from a flame;
    placing the device substantially in the middle of the channel, the device is configured to reduce a self-extinguishing time for the high strength epoxy structural adhesive;
    filling the remainder of the channel with the structural adhesive;
    bending the panel sections relative to each other to close the channel and form the adhesive joint between the panel sections; and
    curing the adhesive.

12. The method of claim 1, wherein the strip of intumescent material is configured to, upon expansion, reduce the temperature of the structural adhesive.

13. The method of claim 1, wherein expansion by the strip of intumescent material does not degrade the adhesive in locations of the joint which are not degraded by flame.

14. The method of claim 1, wherein the strip of intumescent material is configured to expand towards a flame in a vertical bunsen burner test.

15. The method of claim 1, wherein the strip of intumescent material is configured to reduce a self-extinguishing time for the structural adhesive.

16. The method of claim 3, wherein the thermal conductor is configured to lower the temperature of structural adhesive exposed to flame by directing heat away from the structural adhesive exposed to flame.

17. The method of claim 6, wherein the thermal conductor is configured to lower the temperature of structural adhesive exposed to flame by directing heat away from the structural adhesive exposed to flame.

18. The method of claim 4, wherein forming a strip of intumescent material comprises adding reinforcing fibers to the intumescent material.

19. The method of claim 1, wherein the strip of intumescent material comprises reinforcing fibers.

* * * * *